United States Patent
Tamaki et al.

(10) Patent No.: US 7,865,076 B2
(45) Date of Patent: Jan. 4, 2011

(54) COMPOUND EYE-CAMERA MODULE

(75) Inventors: Satoshi Tamaki, Osaka (JP); Tatsutoshi Suenaga, Osaka (JP); Katsumi Imada, Nara (JP)

(73) Assignee: Panasonic Corporation, Osaka (JP)

( * ) Notice: Subject to any disclaimer, the term of this patent is extended or adjusted under 35 U.S.C. 154(b) by 125 days.

(21) Appl. No.: 12/297,803

(22) PCT Filed: Apr. 13, 2007

(86) PCT No.: PCT/JP2007/058171
§ 371 (c)(1),
(2), (4) Date: Oct. 20, 2008

(87) PCT Pub. No.: WO2007/123064
PCT Pub. Date: Nov. 1, 2007

(65) Prior Publication Data
US 2009/0067830 A1 Mar. 12, 2009

(30) Foreign Application Priority Data
Apr. 21, 2006 (JP) ............................... 2006-118330

(51) Int. Cl.
G03B 13/04 (2006.01)
(52) U.S. Cl. ....................................... 396/308; 396/307
(58) Field of Classification Search ......... 396/306–308, 396/322, 323, 335
See application file for complete search history.

(56) References Cited
U.S. PATENT DOCUMENTS
5,852,753 A * 12/1998 Lo et al. ..................... 396/323
6,243,125 B1 * 6/2001 Yuge et al. ................... 347/241
2003/0086013 A1 5/2003 Aratani
2003/0094675 A1 5/2003 Yamamoto et al.

FOREIGN PATENT DOCUMENTS

| JP | 2-106847 | 8/1990 |
|---|---|---|
| JP | 9-127435 | 5/1997 |
| JP | 2000-352663 | 12/2000 |
| JP | 2002-118776 | 4/2002 |
| JP | 2003-133336 | 5/2003 |
| JP | 2003-143459 | 5/2003 |
| JP | 2004-109514 | 4/2004 |
| JP | 2004-333565 | 11/2004 |

* cited by examiner

Primary Examiner—Christopher E Mahoney
Assistant Examiner—Autumn Parker
(74) Attorney, Agent, or Firm—Hamre, Schumann, Mueller & Larson, P.C.

(57) ABSTRACT

A lens module (7) that includes a plurality of lenses (1a, 1b), a plurality of optical filters (2a, 2b) corresponding to the individual lenses (1a, 1b), an imaging device (4) that includes a plurality of imaging regions (4a, 4b) corresponding to the individual optical filters (2a, 2b), and a light-shielding wall (61a to 61d) that is provided perpendicularly to the imaging device (4) are provided. The adjacent imaging regions (4a, 4b) are partitioned by the light-shielding wall (61a). The light-shielding wall (61a) includes a plurality of inclined surfaces (63) that are inclined with respect to an imaging plane of the imaging regions (4a, 4b), and the plurality of inclined surfaces (63) are disposed sequentially from a side of the lens module (7) to a side of the imaging regions (4a, 4b). Each of the inclined surfaces (63) is inclined toward the side of the imaging regions (4a, 4b) with increasing distance from the light-shielding wall (61a).

10 Claims, 9 Drawing Sheets

COMPOUND EYE-CAMERA MODULE

TECHNICAL FIELD

The present invention relates to a small-size thin camera module. In particular, the present invention relates to a compound-eye camera module that captures an image using a plurality of imaging optical lenses.

BACKGROUND ART

In imaging apparatuses such as a digital video and a digital camera, a subject image is formed on an imaging device such as a CCD or a CMOS via a lens, whereby a subject is converted into two-dimensional image information. Patent documents 1 and 2 have proposed an example of a single-eye camera module. Also, Patent document 3 has proposed an example of a camera module that uses two objective lenses to enable three-dimensional observation.

On the other hand, in order to reduce the size and thickness of a camera module, a compound-eye camera module has been proposed.

Patent document 4 describes an example of the compound-eye camera module. In Patent document 4, an imaging optical system has a configuration in which a lens devoted to red wavelength light, a lens devoted to green wavelength light and a lens devoted to blue wavelength light are arranged in a plane. An imaging device is provided with imaging regions for the respective wavelength bands corresponding to the respective lenses.

Thus, the wavelengths of light to which the individual lenses are devoted are limited. This makes it possible to form a subject image on an imaging plane using the single lenses, thereby reducing the thickness of the imaging apparatus considerably.

FIG. 7 is an exploded perspective view showing an imaging system of the conventional camera module as described above. A diaphragm member 111, a lens array 112, a light-shielding block 113, an optical filter array 114 and an imaging device 116 are arranged in this order from the subject side. The lens array 112 includes a plurality of lenses 112a. The diaphragm member 111 includes diaphragms (openings) at positions that coincide with optical axes of the respective lenses of the lens array 112.

The optical filter array 114 includes a plurality of optical filters 114a that have different spectral characteristics for regions corresponding to the respective lenses of the lens array 112 and covers a light receiving surface of the imaging device 116. The light-shielding block 113 includes a light-shielding wall 113a at a position that coincides with each border between the adjacent lenses of the lens array 112, namely, the border between the adjacent optical filters 114a of the optical filter array 114. The imaging device 116 is placed on a semiconductor substrate 115. On the semiconductor substrate 115, a driving circuit 117 and a signal processing circuit 118 also are mounted.

With this camera module, by the light-shielding wall 113a of the light-shielding block 113, it is possible to prevent light that has passed through a certain lens 112a from entering the imaging region that does not correspond to this lens 112a.

However, when an incident angle of a light beam entering the lens 112a increases, the light beam that has passed the lens 112a also has an increased angle accordingly. In the camera module shown in FIG. 7, the light-shielding wall 113a is arranged above the imaging device 116 via the optical filter 114a so as to be substantially in parallel with the optical axis.

Therefore, although a light beam with large incident angle whose image forming position is displaced greatly from the imaging region does not enter the imaging region directly, it is reflected by the light-shielding wall 113a, leading to a problem that a reflected image is formed on a captured picture in the imaging region.

Further, when a hood that restricts the angle of a light beam entering the lens 112a is provided on the subject side in order to remove a ghost image due to this reflection, the height of the camera module increases. On the other hand, when the imaging region is set so that the reflected image is not formed in the imaging region, there is no alternative but to use an imaging device with the unnecessarily large number of pixels or to use a smaller imaging region. In this case, there have been problems of increased cost and lowered performance.

Patent document 1: JP 2002-118776 A

Patent document 2: JP 2 (1990)-106847 U

Patent document 3: JP 9 (1997)-127435 A

Patent document 4: JP 2003-143459 A

DISCLOSURE OF INVENTION

The present invention solves the conventional problems described above, and the object of the present invention is to provide a small and low-cost compound-eye camera module while preventing unwanted incident light from being reflected in an imaging region.

In order to achieve the above-mentioned object, a compound-eye camera module according to the present invention includes a lens module that includes a plurality of lenses, a plurality of optical filters corresponding to the individual lenses, an imaging device that includes a plurality of imaging regions corresponding to the individual optical filters, and a light-shielding wall that is provided perpendicularly to the imaging device. The adjacent imaging regions are partitioned by the light-shielding wall. The light-shielding wall includes a plurality of inclined surfaces that are inclined with respect to an imaging plane of the imaging regions, and the plurality of inclined surfaces are disposed sequentially from a side of the lens module to a side of the imaging regions. Each of the inclined surfaces is inclined toward the side of the imaging regions with increasing distance from the light-shielding wall.

DESCRIPTION OF THE INVENTION

Figure 1:
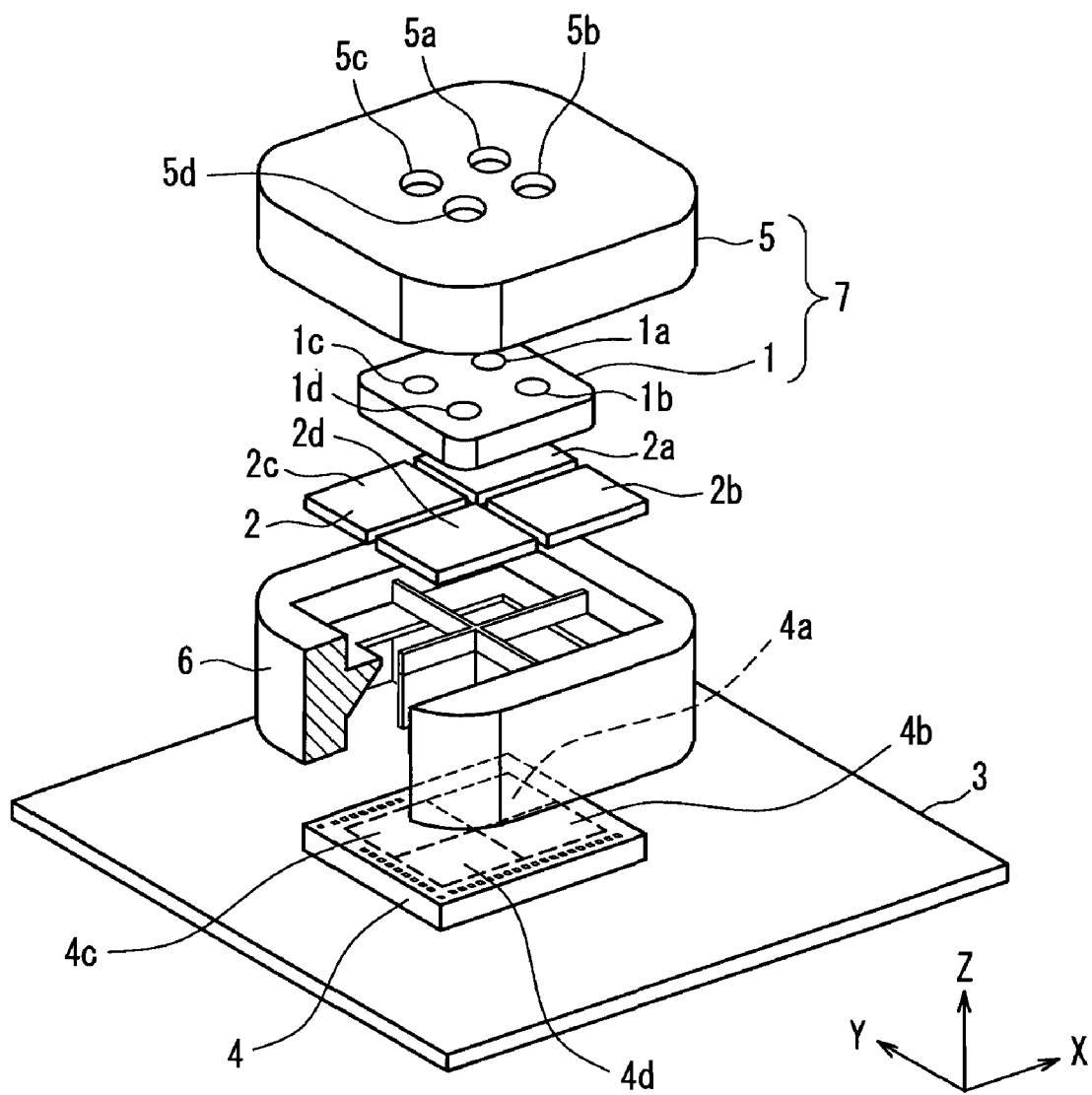
FIG. 1 is an exploded perspective view showing a camera module according to Embodiment 1 of the present invention.

In accordance with the present invention, the inclined surfaces are provided on the light-shielding wall, thereby eliminating the need to provide a hood separately or reduce the size of the imaging region in order to prevent unwanted incident light from being reflected in the imaging region, making it possible to achieve a small and low-cost compound-eye camera module.

In the compound-eye camera module described above, it is preferable that an inclination angle of each of the inclined surfaces is set to an angle at which reflected light of light impinging on the inclined surface among incident light that has passed through the lens module and the optical filter forms an image outside the imaging region. With this configuration, it is possible to prevent unwanted incident light from being reflected in the imaging regions in a more reliable manner.

Also, it is preferable that, when an inclination angle is an angle that a plane parallel with the imaging plane forms with the inclined surface, the plurality of inclined surfaces include inclined surfaces having different inclination angles, and the inclined surfaces having different inclination angles have a smaller inclination angle on the side of the imaging regions than the side of the lens module.

Further, it is preferable that, when an inclination angle is an angle that a plane parallel with the imaging plane forms with the inclined surface, the plurality of inclined surfaces have inclination angles that decrease from the side of the lens module to the side of the imaging regions.

Moreover, it is preferable that, when an inclination angle is an angle that a plane parallel with the imaging plane forms with the inclined surface, the light-shielding wall is divided into a plurality of regions in an optical axis direction of the plurality of lenses according to the inclination angles of the inclined surfaces, and while the inclination angles of the inclined surfaces in each of the regions are set to the same, the inclination angles in the individual regions decrease from the side of the lens module to the side of the imaging regions.

According to the various preferable settings of the inclination angles of the inclined surfaces, it is possible to prevent unwanted incident light from being reflected in the imaging regions in a more reliable manner.

Also, it is preferable that each of the inclined surfaces is a continuous surface that extends in a direction parallel with the imaging plane.

Further, it is preferable that each of the inclined surfaces is separated into a plurality of blocks in a direction parallel with the imaging plane. With this configuration, it is possible to reduce considerably the likelihood that unwanted reflected light caused by the shape of the front end of the light-shielding part will form an image in the imaging region.

Moreover, it is preferable further to include an outer tube part provided with a hollow part, with the light-shielding wall and the imaging device disposed in the hollow part, and the hollow part being inclined so as to expand outward from the side of the lens module to a side of the imaging device and larger than an outer shape of the imaging device at least in a portion surrounding the imaging device. With this configuration, it is possible to prevent incident light with a large incident angle from impinging on the inner surface of the outer tube part, thereby preventing the reflection of the reflected light reflected by the inner surface of the outer tube part in the imaging region. Further, even in the configuration in which the incident light impinges on the inner surface of the outer tube part, since the hollow part is larger than the outer shape of the imaging device in the portion surrounding the imaging device, the reflected light from the inner surface of the outer tube part can be made to form an image outside the imaging region.

Additionally, it is preferable that an inclination angle of each of the inclined surfaces, an inclination angle of a portion of the hollow part inclined so as to expand outward and a size of the portion of the hollow part surrounding the imaging device are set so that reflected light of light impinging on the inclined surface among incident light that has passed through the lens module and the optical filter forms an image outside the imaging region. With this configuration, it is possible to prevent unwanted incident light from being reflected in the imaging regions in a more reliable manner.

The following is a description of an embodiment of the present invention, with reference to the accompanying drawings.

Embodiment 1

FIG. 1 is an exploded perspective view showing a compound-eye camera module according to Embodiment 1 of the present invention. In FIG. 1, numeral 1 denotes a lens array, numeral 2 denotes an optical filter array, numeral 3 denotes a substrate, numeral 4 denotes an imaging device, numeral 5 denotes an upper barrel, and numeral 6 denotes a light-shielding block.

For the convenience of description, an XYZ rectangular coordinate system as shown in the figure is set. The Z axis is an axis that passes through a substantial center of an effective pixel region of the imaging device 4 and is perpendicular to the effective pixel region. The Z-axis direction also is an optical axis direction of each of lenses forming the lens array 1. The X axis is an axis that is perpendicular to the Z axis and parallel with light-shielding walls 61a and 61c, which will be described later, of the light-shielding block 6. The Y axis is an axis that is perpendicular to the Z axis and parallel with light-shielding walls 61b and 61d, which will be described later, of the light-shielding block 6.

The lens array 1 is formed by making four single lenses 1a, 1b, 1c and 1d as one piece. The four lenses 1a to 1d are arranged in the same plane that is parallel with the XY plane. Individual optical axes of the four lenses 1a to 1d are parallel with the Z axis and arranged so as to pass through four vertexes of a virtual rectangle that is parallel with the XY plane.

The lenses 1a to 1d are designed so as to meet optical specifications such as MTF required for light in any of wavelength bands of red, blue and green of the three primary colors of light. More specifically, the lens 1a, the lens 1b, the lens 1c and the lens 1d are designed optimally for light in the red, green, green, blue wavelength bands, respectively. The lenses 1a to 1d are formed as one piece using a material such as glass or plastics. Light from a subject (not shown) passes through the individual lenses 1a to 1d and the optical filter array 2, and then an image is formed on the imaging device 4.

The optical filter array 2 is disposed between the lens array 1 and the imaging device 4. Similarly to the lens array 1, the optical filter array 2 includes four optical filters 2a, 2b, 2c and 2d arranged in the same plane that is parallel with the XY plane.

Each of the four optical filters 2a to 2d only transmits light in any of red, green and blue wavelength bands. More specifically, the optical filter 2a transmits light in the red wavelength band, the optical filter 2b transmits light in the green wavelength band, the optical filter 2c transmits light in the green wavelength band, and the optical filter 2d transmits light in the blue wavelength band.

Incidentally, if infrared rays need to be cut, such a property may be added to the optical filters 2a to 2d. The four optical filters 2a to 2d are arranged respectively on the optical axes of the four lenses 1a to 1d.

The imaging device 4 is an imaging sensor such as a CCD and includes a large number of pixels that are arranged two-dimensionally in rows and columns. The effective pixel region of the imaging device 4 is divided substantially evenly into four imaging regions 4a, 4b, 4c and 4d. Incidentally, there is no limitation to this configuration, and uneven regions may be provided, taking into consideration a parallax amount.

The four imaging regions 4a to 4d are arranged respectively on the individual optical axes of the four lenses 1a to 1d. In this way, subject images each formed only of a wavelength component of any of red, green and blue are formed independently of one another on the four imaging regions 4a to 4d, respectively.

More specifically, only the light in the red wavelength band in the light from the subject that has passed through the lens 1a passes through the optical filter 2a and forms the subject image formed only of the red wavelength component on the imaging region 4a. Similarly, only the light in the green wavelength band in the light from the subject that has passed through the lens 1b passes through the optical filter 2b and forms the subject image formed only of the green wavelength component on the imaging region 4b. Only the light in the green wavelength band in the light from the subject that has passed through the lens 1c passes through the optical filter 2c and forms the subject image formed only of the green wavelength component on the imaging region 4c. Only the light in the blue wavelength band in the light from the subject that has passed through the lens 1d passes through the optical filter 2d and forms the subject image formed only of the blue wavelength component on the imaging region 4d.

Each of the pixels constituting the imaging regions 4a to 4d of the imaging device 4 subjects incident light from the subject to photoelectric conversion and outputs an electric signal (not shown) according to the intensity of the light. The electric signal outputted from the imaging device 4 is subjected to various signal processings and processed into a picture. For example, from two images captured by the imaging regions 4b and 4c that light in the green wavelength band enters, it is possible to determine a parallax amount between these images. In this way, the parallax amounts between the four images captured respectively by the four imaging regions 4a to 4d are determined. The images of three colors of red, green and blue are synthesized considering these parallax amounts, thereby forming one color image.

Also, by comparing two images captured by the imaging regions 4b and 4c and using the parallax amount between the images, it is possible to measure the distance to the subject. These processings can be performed using a digital signal processor (DSP; not shown) or the like.

The upper barrel 5 is fixed such that the lens array 1 is held on its lower surface. The lens array 1 and the upper barrel 5 holding this lens array 1 constitute a lens module 7. Four diaphragms (openings) 5a, 5b, 5c and 5d are formed at positions through which the individual optical axes of the four lenses 1a to 1d of the held lens array 1 pass. The upper barrel 5 is formed of a material that does not transmit light, thereby blocking the entrance of unwanted external light into the lenses 1a to 1d from portions other than the diaphragms 5a to 5d.

Figure 2:
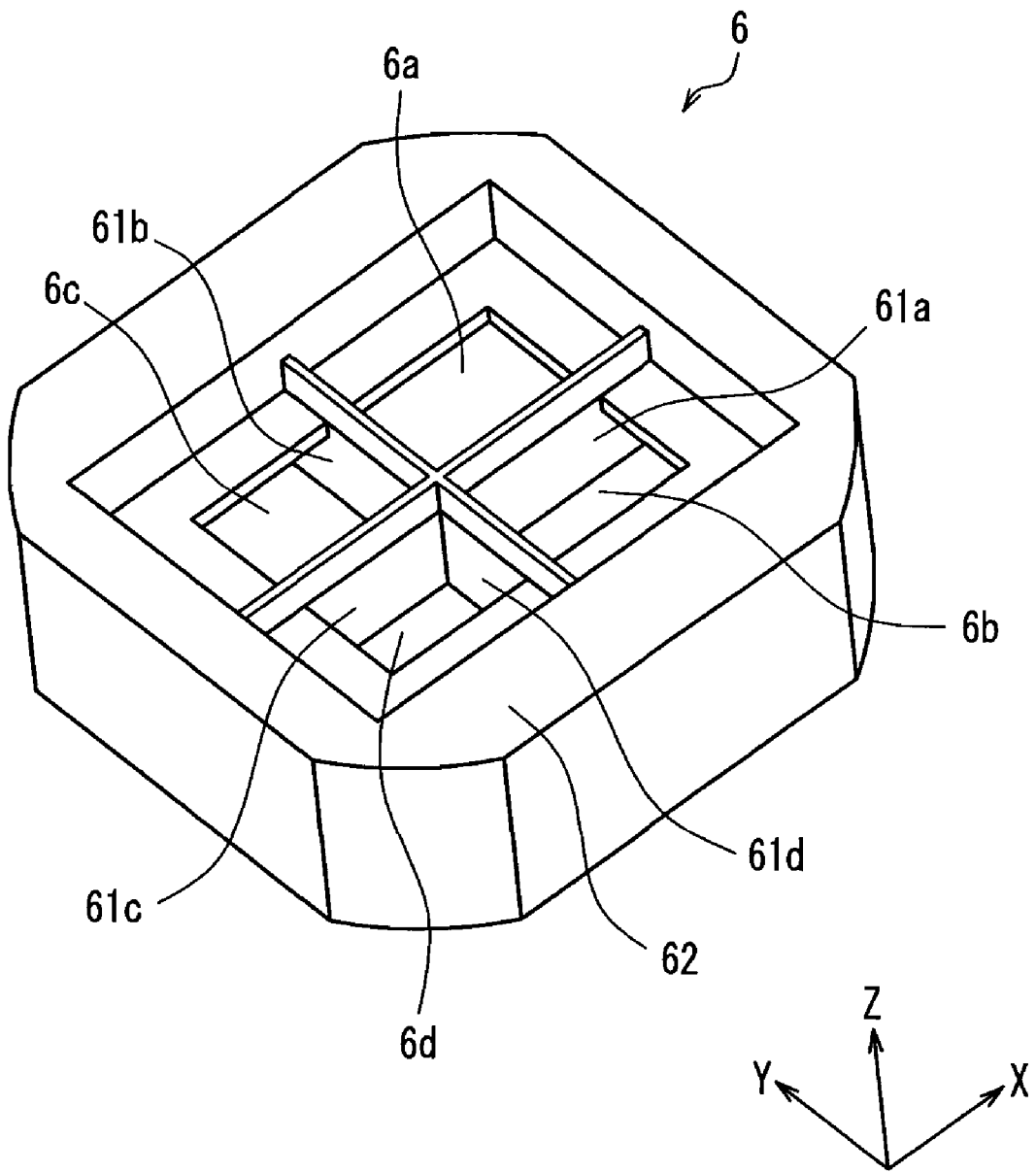
FIG. 2 is a perspective view showing a light-shielding block according to Embodiment 1 of the present invention.

FIG. 2 is a perspective view showing the light-shielding block 6 viewed from the subject side. An outer tube part 62 holds the light-shielding walls 61a, 61b, 61c and 61d that are arranged in a crisscross manner, thereby constituting the light-shielding block 6. An inside of the outer tube part 62 is partitioned by the light-shielding walls 61a to 61d arranged in a crisscross manner, so that four openings 6a, 6b, 6c and 6d that are independent of one another are formed.

The light-shielding walls 61a to 61d extend radially (crisscross) with respect to the Z axis, which is a central axis of the light-shielding block 6, with the light-shielding walls 61a and 61c extending along the XZ plane and the light-shielding walls 61b and 61d extending along the YZ plane. The four openings 6a to 6d are arranged respectively on the optical axes of the four lenses 1a to 1d. The light-shielding walls 61a to 61d partition the effective pixel region of the imaging device 4 into the four imaging regions 4a to 4d (see FIG. 1).

The size of the openings 6a to 6d viewed from the side of the lens module 7 in the direction parallel with the Z axis is substantially the same as or larger than the imaging regions 4a to 4d. Light from the subject that has passed through the lenses 1a to 1d passes through the openings 6a to 6d, and then respective images are formed on the imaging regions 4a to 4d. The light-shielding walls 61a to 61d can prevent light that has passed through one of the lenses 1a to 1d from entering the imaging region that does not correspond to that lens.

Figure 8:
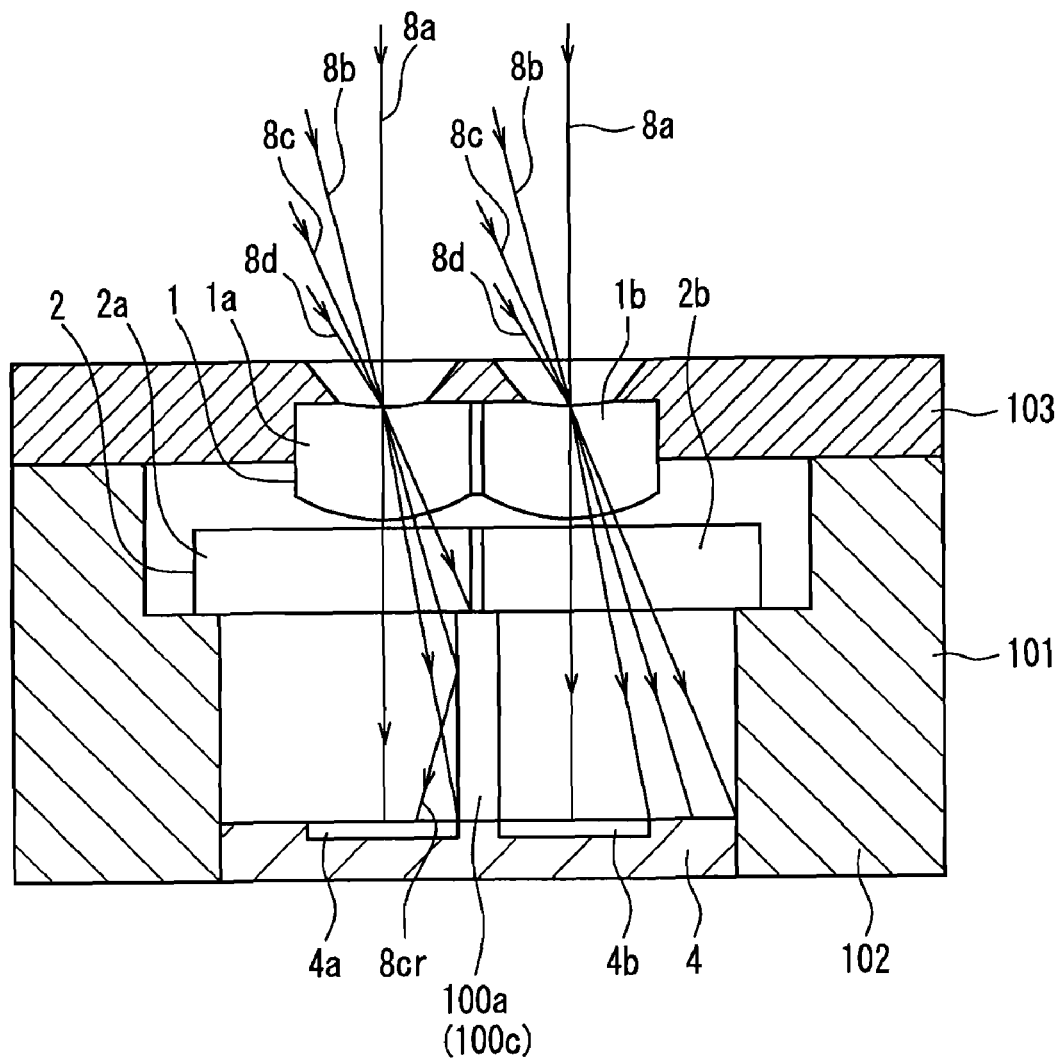
FIG. 8 shows light rays at a cross-section of an example of a conventional camera module.

Now, for comparison with the present embodiment, an example of a conventional camera module will be described as a comparative example. FIG. 8 shows light rays at a cross-section passing through the optical axis of a lens of the camera module according to the comparative example. This figure corresponds to the figure showing light rays at a cross-section along the YZ plane passing through the lenses 1a and 1b of the camera module of FIG. 1.

The same structures as those in FIGS. 1 and 2 are assigned the same reference numerals. Light-shielding walls 100a to 100d correspond to the light-shielding walls 61a to 61d in FIG. 2, a light-shielding block 101 corresponds to the light-shielding block 6 in FIG. 1, an outer tube part 102 corresponds to the outer tube part 62 in FIG. 2, and an upper barrel 103 corresponds to the upper barrel 5 in FIG. 1.

Incident light 8a to incident light 8d from the subject have increased incident angles sequentially from 8a to 8d. Here, the incident angle refers to an angle between the light beam 8a passing through the optical axis of the lens and each of the incident light beams.

In the configuration in FIG. 8, the imaging regions are set so as to allow the light beams from the incident light 8a to the incident light 8b to be captured. The light beams 8c and 8d having a larger incident angle than the incident light 8b also enter the lens 1a and pass through the optical filter 2a, similarly to the incident light 8a and the incident light 8b. Light in the red wavelength band in these lights is blocked by the light-shielding wall 100a provided along the border between the imaging region 4a and the imaging region 4b so as not to enter the imaging region 4b that only the light in the green wavelength band should enter. On the other hand, the outer tube part 102 prevents external light that does not pass through the lens array 1 and the optical filter array 2 from entering the imaging regions 4a to 4d.

In this configuration, the light-shielding walls 100a to 100d are formed in the Z direction that is substantially perpendicular to the imaging plane. Therefore, it is possible to prevent, for example, the light beam of the incident light 8c that has passed through the lens 1a and the filter 2a from entering the imaging region 4b that only the light in the green wavelength band should enter. However, the incident light 8c impinges on the light-shielding wall 100a, reflected light 8cr that is reflected by the light-shielding wall 100a enters the imaging region 4a, and the reflected image is formed on the captured picture in the imaging region 4a.

This also applies to the case in which an inner surface of the outer tube part 102 that is located on an outer periphery of the imaging device 4 and holds the light-shielding walls 100a to 100d is formed near the imaging device 4 in the Z direction that is substantially perpendicular to the imaging device 4. In other words, when an incident light beam that passes through the lens 1b and the filter 2b and has a larger incident angle than the incident light 8d enters, the incident light beam impinges on the inner surface of the outer tube part 102, and its reflected light is reflected in the imaging region 4b (not shown), similarly to the reflected light 8cr.

Figure 3:
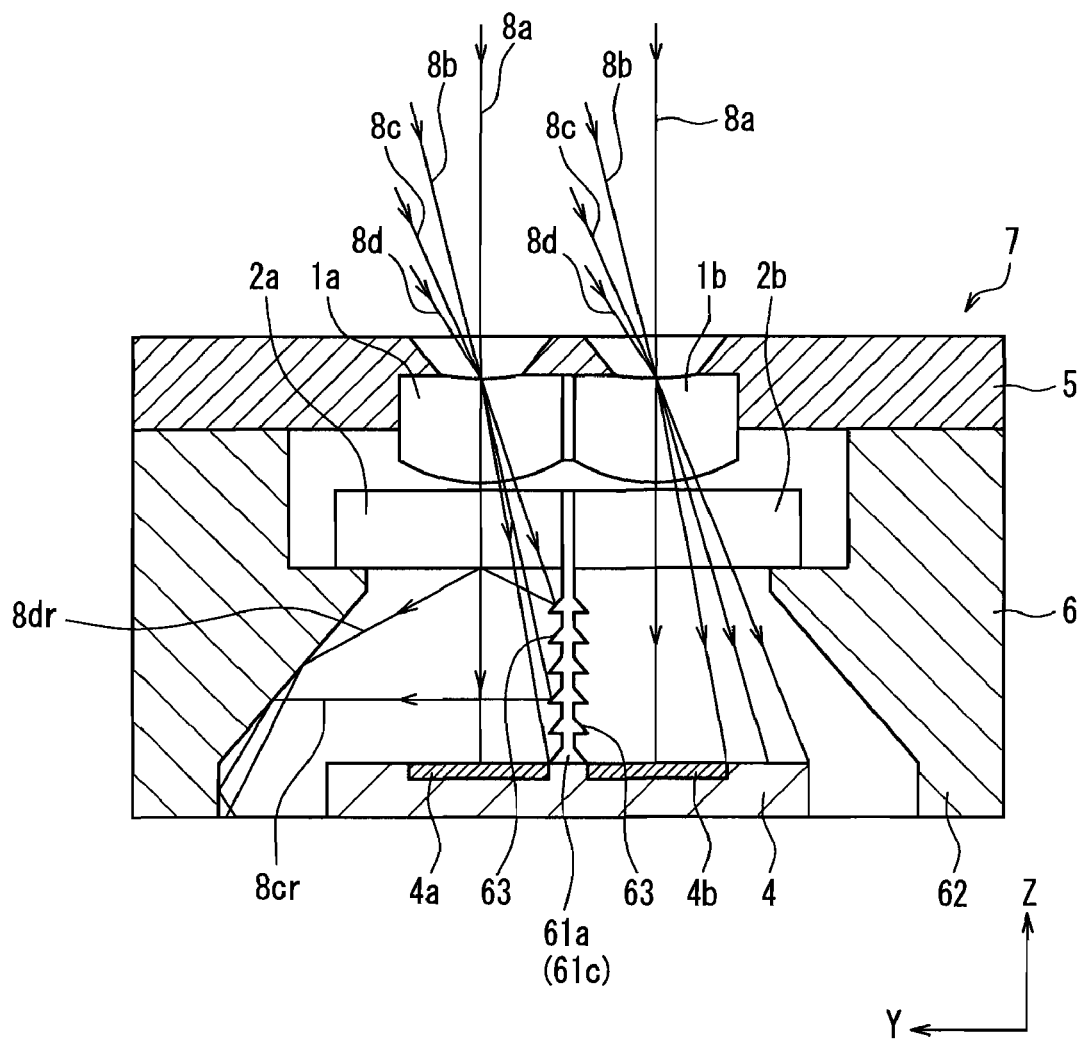
FIG. 3 shows light rays at a cross-section of the camera module according to Embodiment 1 of the present invention.

In the following, the present embodiment will be described more specifically. FIG. 3 shows light rays at a cross-section passing through the optical axis of a lens in the compound-eye camera module according to Embodiment 1. This figure shows light rays when the camera module in FIG. 1 is sectioned along the YZ plane passing through the lenses 1a and 1b.

Incident light 8a to incident light 8d from the subject have increased incident angles sequentially from 8a to 8d. The imaging regions are set so that light beams from the incident light 8a to the incident light 8d can be captured. This point is similar to the example shown in FIG. 8.

As described earlier referring to FIGS. 1 and 2, the light-shielding walls 61a to 61d are provided perpendicularly along the Z direction that is substantially perpendicular to the imaging planes 4a to 4d. Both surfaces of each of the light-shielding walls 61a to 61d are provided with a plurality of inclined surfaces 63. The plurality of inclined surfaces 63 are disposed sequentially from the side of the lens module 7 to the side of the imaging regions 4a to 4d. In other words, the plurality of inclined surfaces 63 are disposed sequentially along the Z direction that is substantially perpendicular to the imaging regions 4a to 4d, namely, the optical axis direction of each of the lenses 1a to 1d.

The inclined surface 63 is inclined with respect to the imaging plane of the imaging regions 4a to 4d. More specifically, each of the inclined surfaces 63 is an inclined surface that is inclined toward the side of the imaging regions 4a to 4d with increasing distance from the light-shielding walls 61a to 61d. In other words, each of the inclined surfaces 63 is inclined such that its front end extends toward the side of the imaging regions 4a to 4d.

With the above-described configuration of FIG. 8, the incident light 8c that has passed through the lens 1a and the filter 2a impinges on the light-shielding wall 100a, and its reflected light 8cr forms an image in the imaging region 4a. In the configuration according to the present embodiment shown in FIG. 3, the incident light 8c is reflected by the inclined surface 63, and its reflected light 8cr is reflected by the inner surface of the outer tube part 62 and forms an image outside the imaging region 4a.

Similarly, in the configuration shown in FIG. 3, the light beam 8d having a larger incident angle than the incident light 8c passes through the lens 1a and the filter 2a, and then is reflected by the inclined surface 63 and the filter 2a. Thereafter, its reflected light 8dr is reflected by the inner surface of the outer tube part 62 and forms an image outside the imaging region 4a. Accordingly, the reflected light of the light beams 8c and 8d having a larger incident angle than the incident light 8b is not reflected on the captured picture in the imaging region 4a.

Here, in the configuration shown in FIG. 8 according to the comparative example, in order to prevent the reflected light from entering the imaging region, it is necessary to use a hood on the subject side so that the light beams having a larger incident angle than the incident light 8b, for example, the light beams 8c and 8d do not enter the lens 1a. On the other hand, in the configuration shown in FIG. 3 according to the present embodiment, it is not necessary to use any hood on the subject side because, even when the light beams having a larger incident angle than the incident light 8b, for example, the light beams 8c and 8d enter the lens 1a, they form an image outside the imaging region 4a as described above.

Also, in the configuration shown in FIG. 8 according to the comparative example, the incident light 8b forms an image near the border between the imaging region 4a and the light-shielding wall 100a. As the incident angle of the incident light becomes smaller than that of the incident light 8b, an image forming position of the incident light in the imaging region 4a moves closer to the center of the optical axis, namely, the image forming position of the incident light 8a. In other words, in the configuration shown in FIG. 8, a portion near the light-shielding wall 100a also serves as the imaging region. However, as described above, the reflected light 8cr resulting from the reflection of the light beam 8c by the light-shielding wall 100a, for example, enters this portion, so that the reflected image is formed.

On the other hand, in the configuration shown in FIG. 3 according to the present embodiment, the reflected image formed in the imaging region 4a is prevented because, even when the light beams having a larger incident angle than the incident light 8b, for example the light beams 8c and 8d, enter the lens 1a, the reflected light 8cr and the reflected light 8dr from the light-shielding wall 61a form images outside the imaging region 4a as described above.

Accordingly, a portion up to the border between the imaging region 4a and the light-shielding wall 61a can be used as the imaging region, and the portion near the light-shielding wall 61a can be used as the imaging region. Thus, when the light-shielding walls 61a to 61d are provided perpendicularly in the same imaging device in FIGS. 1 and 2, a portion up to the border with the light-shielding walls 61a to 61d in the imaging device can be used as the imaging region. In other words, it also becomes possible to use all the portion except for a portion immediately under the light-shielding walls 61a to 61d in the imaging device as the imaging region.

Further, a hollow part of the outer tube part 62 is inclined so as to expand outward from the side of the lens module 7 to the side of the lens imaging device 4 and is larger than an outer shape of the imaging device 4 at least in a portion surrounding the imaging device 4. This prevents incident light having a larger incident angle than the incident light 8d in incident light passing through the lens 1b and the filter 2b from impinging on the inner surface of the outer tube part 62. Also, even in the configuration in which the incident light impinges on the inner surface of the outer tube part 62, the light reflected by the inner surface of the outer tube part 62 forms an image outside the imaging region 4b because the portion of the hollow part surrounding the imaging device 4 is larger than the outer shape of the imaging device 4.

Figure 4:
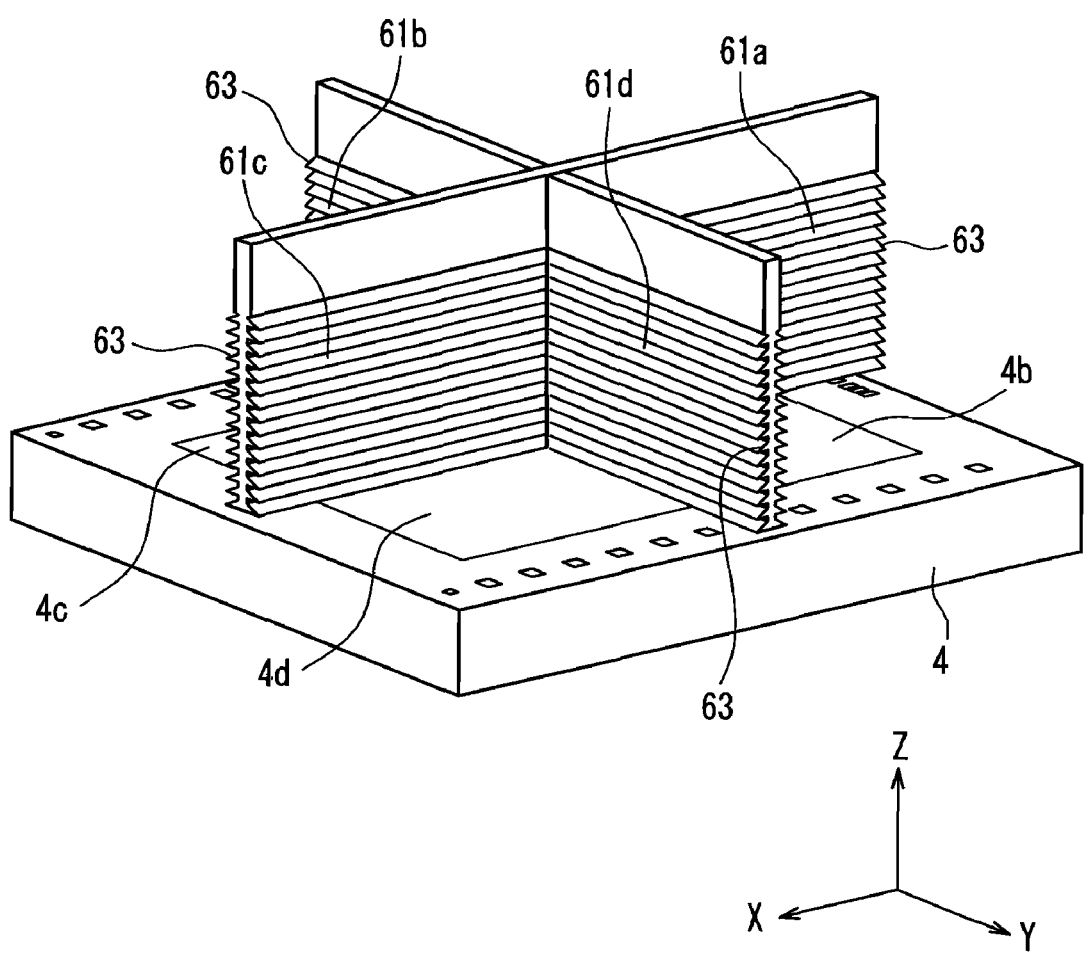
FIG. 4 is a perspective view showing light-shielding walls and an imaging device according to Embodiment 1 of the present invention.

FIG. 4 is a perspective view specifically showing the light-shielding walls 61a to 61d and the imaging device 4 in the configuration shown in FIG. 3. As becomes clear from FIG. 4, the inclined surfaces 63 of the light-shielding walls 61a and 61c are formed continuously in the X direction along the respective light-shielding walls, and the inclined surfaces 63 of the light-shielding walls 61b and 61d are formed continuously in the Y direction along the respective light-shielding walls.

As described above, the present embodiment makes it possible not only to prevent light from a lens from entering the imaging region that does not correspond to that lens, but also to resolve a ghost image, which is caused by the fact that incident light that will be displaced from the imaging region because of its large incident angle is reflected by the light-shielding wall and then reflected on a picture. This eliminates the need for a hood on the subject side so that light with a large incident angle does not enter, thus allowing the reduction of size and cost of the camera module.

Also, the present embodiment makes it possible to use all the portion except for the portion immediately under the light-shielding wall in the imaging device as the imaging region as described above. This eliminates the need to use a large imaging device having a large number of unnecessary pixels or reduce the size of the imaging region unnecessarily so that the reflected light from the light-shielding wall is not reflected on the imaging region. In this respect, it also is possible to reduce the size and the cost of the camera module.

Although the embodiment described above has illustrated the optical system in which light from the subject is split into four lights in the red, green, green and blue wavelength bands, there is no limitation to this. For example, an optical system that splits the light into two lights in near-infrared wavelength bands and two lights in green wavelength bands may be provided, and lights in any other wavelength bands may be combined. In other words, regardless of lights in wavelength bands to be selected, it is possible to achieve the effect of the present embodiment.

Furthermore, the arrangement of the optical systems for calculating the parallax is not limited to that in the above-described embodiment, either. The optical systems may be arranged along the X direction or the Y direction, with the wavelength bands to be selected being the same.

Embodiment 2

Figure 5A:
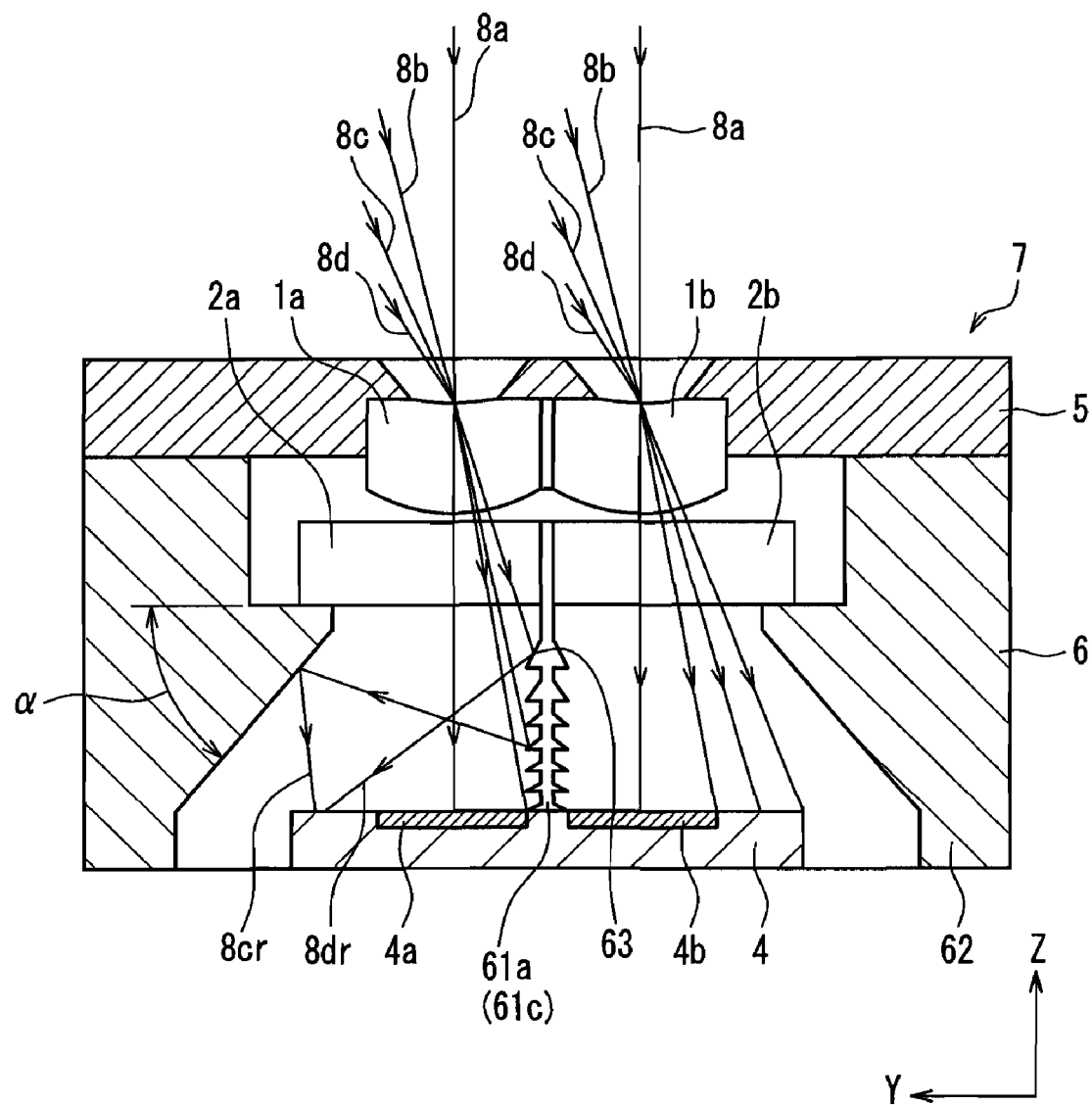
FIG. 5A shows light rays at a cross-section of a camera module according to Embodiment 2 of the present invention.
Figure 5B:
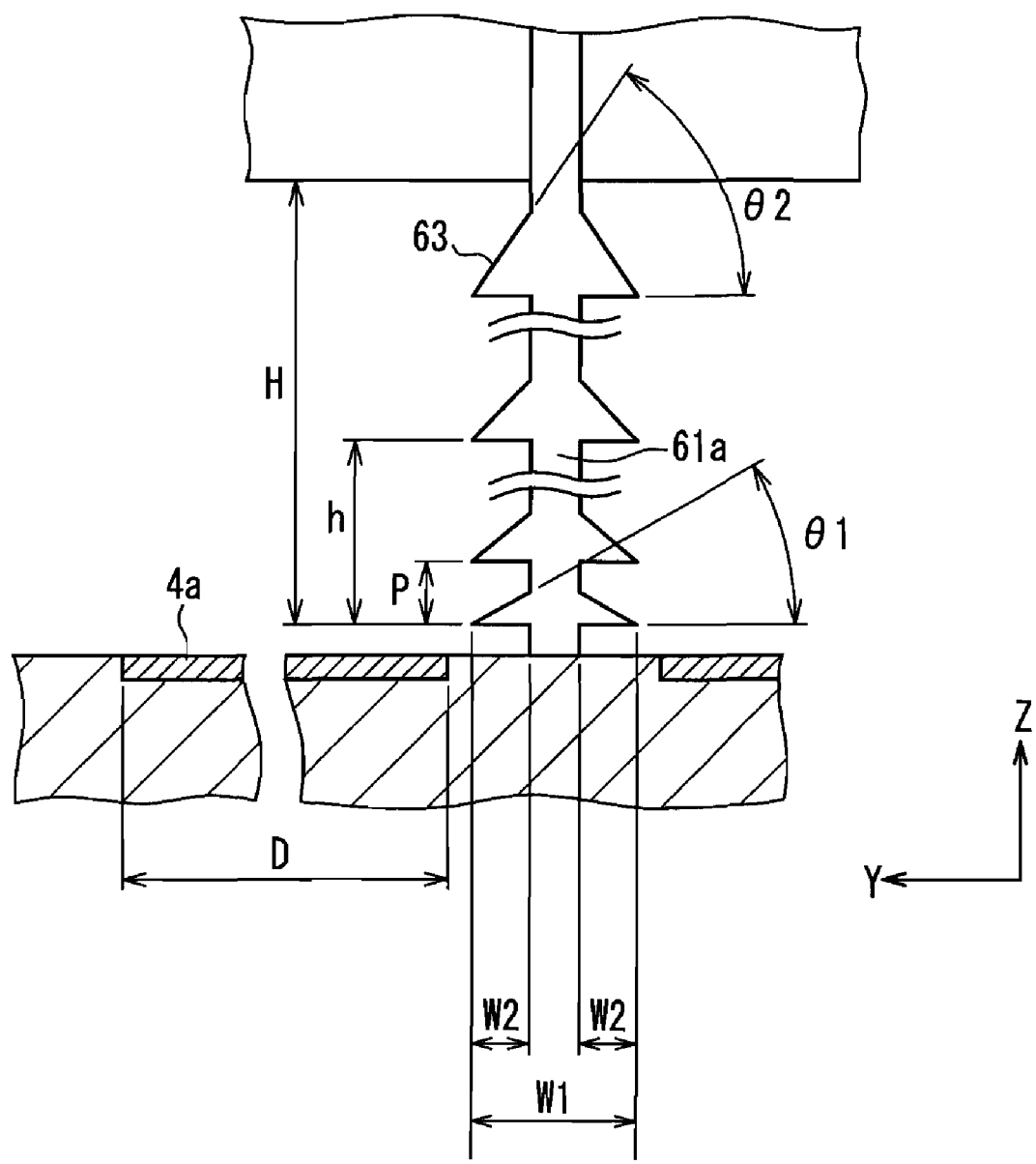
FIG. 5B is an enlarged view showing a portion of a light-shielding wall in FIG. 5A.

In the following, Embodiment 2 of the present invention will be described, with reference to FIGS. 5A and 5B. FIG. 5A shows light rays in a compound-eye camera module according to Embodiment 2 of the present invention. Similarly to FIG. 3, this figure corresponds to the figure showing light rays at a cross-section along the YZ plane passing through the lenses 1a and 1b of the camera module of FIG. 1. FIG. 5B is an enlarged view showing a portion of a light-shielding wall in FIG. 5A.

The present embodiment has a similar configuration to Embodiment 1 except for an inclination angle of the inclined surfaces of the light-shielding wall. Thus, individual structures are assigned the same reference numerals as those in Embodiment 1, and the redundant description thereof will be omitted.

In FIGS. 5A and 5B, similarly to Embodiment 1, the light-shielding walls 61a to 61d are provided perpendicularly in the Z direction that is substantially perpendicular to the imaging plane. The configuration shown in FIGS. 5A and 5B is different from that in Embodiment 1 in the inclination angles of the inclined surfaces 63. The inclination angles of the inclined surfaces 63 are unified in the configuration of Embodiment 1, whereas the inclination angles differ depending on the positions of the inclined surfaces 63 in the configuration of Embodiment 2.

In the example illustrated in FIGS. 5A and 5B, the inclination angles of the inclined surfaces 63 decrease from the side of the lens module 7 to the side of the imaging device 4. The inclination angle used here for description is an angle that the XY plane parallel with the imaging plane forms with the inclined surface (see angles θ1 and θ2 in FIG. 5B). The position at which incident light passing through the lens 1a and the filter 2a impinges on the light-shielding wall 61a becomes closer to the side of the lens module 7 as the incident angle of the incident light increases from 8a to 8d, and the angle that the incident light impinging on the light-shielding wall 61a forms with the light-shielding wall 61a also increases.

In other words, when the incident angle of the incident light is small, the incident light with a small angle impinges on the light-shielding wall 61a close to the imaging device 4. Conversely, when the incident angle of the incident light is large, the incident light with a large angle impinges on the light-shielding wall 61a close to the lens module 7.

The incident light that impinges on the light-shielding wall 61a close to the imaging device 4 is focused relatively and has an intense power. Thus, reflected light that is incident with a small angle and impinges on the light-shielding wall 61a among incident light unnecessary for imaging has to be reflected to an outside of the imaging region 4a reliably. In the present embodiment, the inclination angles of the inclined surfaces 63 are set to become smaller from the side of the lens module 7 to the side of the imaging device 4, whereby the reflected light is reflected to the outside of the imaging region reliably.

In the example illustrated in FIG. 5A, incident light 8c impinges on an inclined surface 63 with a small inclination angle on the side of the imaging region 4a, is reflected toward the lens module 7 and then reflected by an inner surface of the outer tube 62 (reflected light 8cr), so that an image is formed outside the imaging region 4a.

On the other hand, an incident light beam with a large angle impinges on the light-shielding wall 61a on the side of the lens module 7. In this case, if the inclination angle of the inclined surface 63 on the side of the lens module 7 is set to be as small as the small inclination angle of the inclined surface 63 on the side of the imaging device 4, reflected light impinges on a lower surface of the filter 2a. Depending on the angle that has been set, the light reflected by the lower surface of the filter 2a may impinge on the imaging region 4a.

Incidentally, although the reflected light impinges on the lower surface of the filter 2a in the example illustrated in FIG. 3, the inclination angle of the inclined surface is set so that reflected light 8dr does not impinge on the imaging region 4a.

In the present embodiment, the inclination angle of the inclined surface 63 on the side of the lens module 7 is set to be larger than that of the inclined surface 63 on the side of the imaging device 4 so that the reflected light does not form an image in the imaging region 4a. In the example illustrated in FIG. 5A, incident light 8d having a larger incident angle than the incident light 8c impinges on the inclined surface 63 having a larger inclination angle than the inclined surface 63 on the side of the imaging device 4 and is reflected on the side of the imaging device 4 (reflected light 8dr), so that an image is formed outside the imaging region 4a.

The following is an example. An inclination angle α (see FIG. 5A) of the inner surface of the outer tube part 62 of the light-shielding block 6 was set to 40°. In FIG. 5B, the light-shielding wall 61a had a configuration provided with 15 inclined surfaces 63 that were arranged with a pitch P of 0.1 mm within the distance corresponding to a height H, which was 1.5 mm. The inclination angles of the inclined surfaces 63 were set to decrease from the side of the lens module 7 (see FIG. 5A) to the side of the imaging region 4a. The inclination angle θ2 of the uppermost inclined surface 63 was set to 42°, and the inclination angle θ1 of the lowermost inclined surface 63 was set to 33°.

The largest width W1 of the light-shielding wall 61a including the inclined surfaces 63 was set to 0.16 mm, and the dimension W2 of the light-shielding wall 61a protruding from a vertical surface was set to 0.06 mm. The dimension D of the imaging region 4a was set to 1.41 mm.

Incidentally, although the above example has been directed to the light-shielding wall 61a and the imaging region 4a illustrated in FIG. 5B, the exemplary numerals described above are similar for the other three light-shielding walls and imaging regions that are not shown in the figure.

The present embodiment makes it possible to prevent the reflected light from impinging on the lower surface of the filter by changing the inclination angles of the inclined surfaces, so that the reflected light can be made to form an image outside the imaging region more reliably. The reduction in size and cost of the camera module can be achieved similarly to Embodiment 1 described above.

The above description has been directed to the example in which the inclination angles of the inclined surfaces 63 decrease from the side of the lens module 7 to the side of the imaging region 4a. On the other hand, in FIG. 5B, the light-shielding wall 61a may be divided into two regions, i.e., an upper region and a lower region in the Z direction according to the inclination angles of the inclined surfaces 63, and the inclination angle of the inclined surfaces 63 in the lower region may be set to the angle θ1 and the inclination angle of the inclined surfaces 63 in the upper region may be set to the angle θ2.

For example, it is possible that, in FIG. 5B, an interval h (0.8 mm) between the front ends of the inclined surfaces 63 is set to the lower region, 8 inclined surfaces 63 with an inclination angle θ1 of 33° are formed in this lower region, and 7 inclined surfaces 63 with an inclination angle θ2 of 42° are formed in the upper region.

Further, the light-shielding wall 61a may be divided into three or more regions according to the inclination angles of the inclined surfaces 63. In this case, while the inclination angles in the same region are set to be the same, those in the different regions are set to decrease from the side of the lens module 7 to the side of the imaging region 4a.

Embodiment 3

Figure 6:
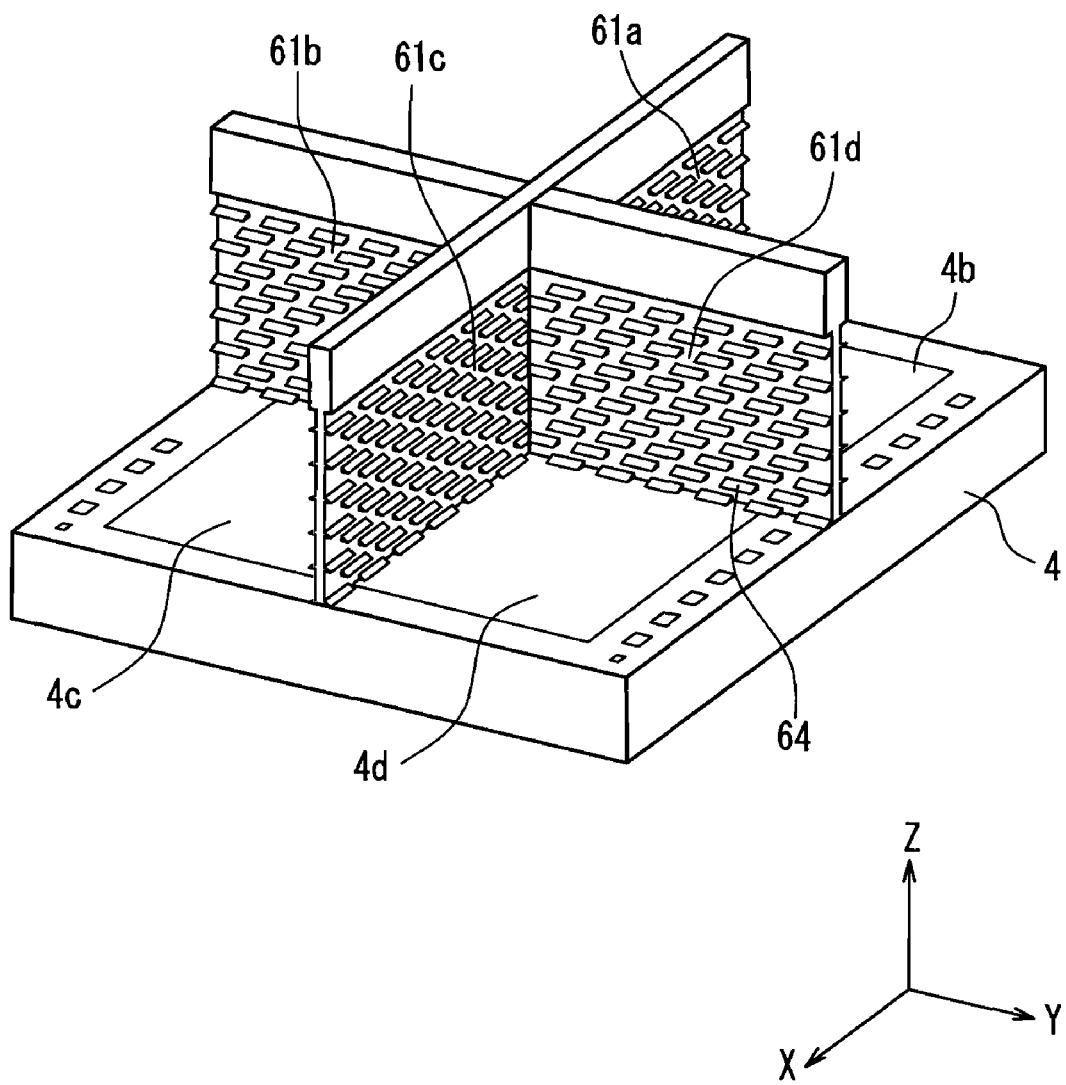
FIG. 6 is a perspective view showing light-shielding walls and an imaging device according to Embodiment 2 of the present invention.
Figure 7:
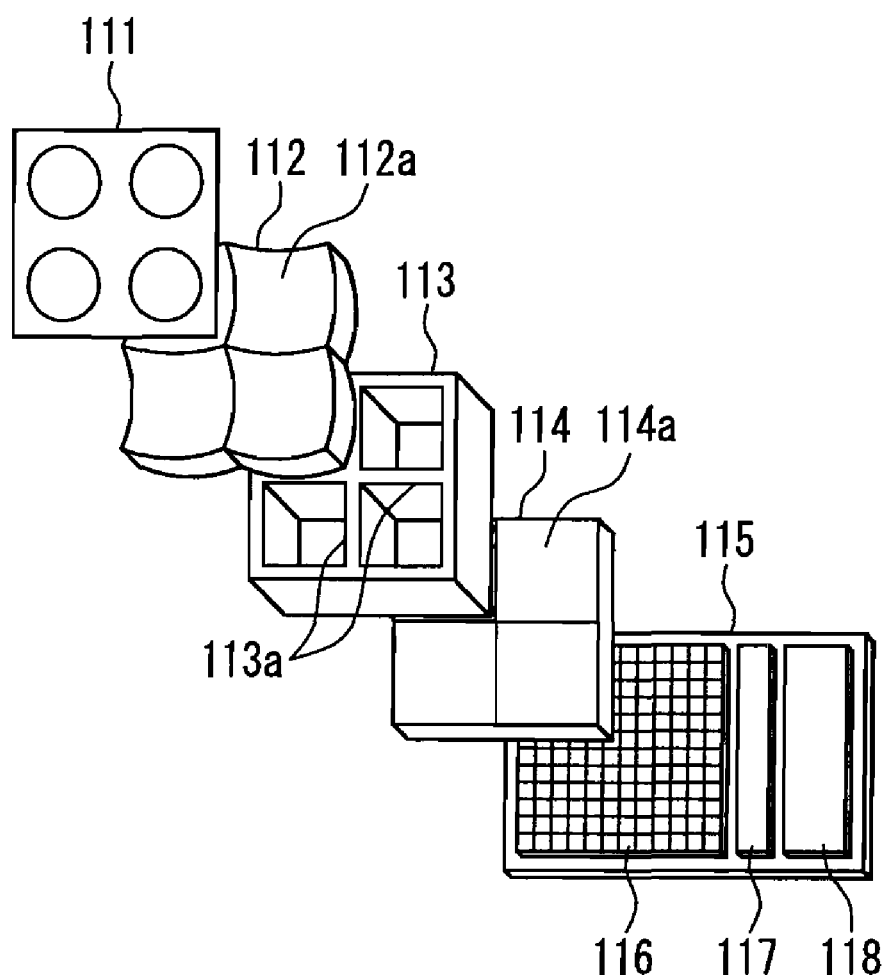
FIG. 7 is an exploded perspective view showing an example of a conventional camera module.

In the following, Embodiment 3 of the present invention will be described, with reference to FIG. 6. FIG. 6 is a perspective view specifically showing an imaging device and light-shielding walls in a compound-eye camera module according to Embodiment 3. This figure corresponds to FIG. 4 in Embodiment 1. The present embodiment has a similar configuration to Embodiment 1 except for the configuration of the inclined surfaces of the light-shielding walls. Thus, structures that are the same as those in Embodiment 1 are assigned the same reference numerals, and the redundant description thereof will be omitted.

The configuration of FIG. 6 is different from that of FIG. 4 in Embodiment 1 in the inclined surfaces. In the configuration of FIG. 4, each of the inclined surfaces 63 is formed continuously in the X direction or the Y direction along the light-shielding wall. In contrast, in the configuration of FIG. 6, each of the inclined surfaces is separated into a plurality of blocks 64, and the blocks 64 are arranged intermittently in the X direction or the Y direction. Also, when a row of the blocks 64 arranged intermittently in the X direction or the Y direction is viewed along the Z direction, the blocks 64 are positioned alternately, i.e., the blocks 64 are arranged in a staggered manner.

Although not shown in the figure here, a front end portion of the inclined surface sometimes does not have a perfect edge shape. In other words, a finite shape due to processing sometimes remains in a direction parallel with the Z axis. In the case where each of the inclined surfaces 63 is formed continuously in the X direction or the Y direction as shown in FIG. 4, if the front end of the inclined surface 63 does not have a perfect edge shape and the finite shape as described above remains, it becomes more likely that incident light may impinge on this front end and its reflected light may form an image in the imaging region.

In the present embodiment, the inclined surfaces are divided into the blocks, which are arranged in a staggered manner. This reduces the area of the front end portion of the inclined surface in the Z direction, resulting in a considerably smaller likelihood that unwanted reflected light caused by the shape of the front end of the inclined surface will form an image in the imaging region.

On the other hand, in this configuration, light impinges on a vertical wall surface extending in an optical axis direction where there is no block. However, light reflected by this vertical wall surface is reflected further by the inclined surface provided on the light-shielding wall and forms an image outside the imaging region.

INDUSTRIAL APPLICABILITY

As described above, since the present invention makes it possible to achieve a small-size thin camera module, it is useful for a mobile phone with a camera function, a digital still camera, a monitoring camera, a vehicle-mounted camera, for example.

The invention claimed is:

1. A compound-eye camera module comprising:
a lens module that comprises a plurality of lenses;
a plurality of optical filters corresponding to the individual lenses;
an imaging device that comprises a plurality of imaging regions corresponding to the individual optical filters; and
a light-shielding wall that is provided perpendicularly to the imaging device;
wherein the adjacent imaging regions are partitioned by the light-shielding wall,
the light-shielding wall comprises a plurality of inclined surfaces that are inclined with respect to an imaging plane of the imaging regions, the plurality of inclined surfaces being disposed sequentially from a side of the lens module to a side of the imaging regions, and
each of the inclined surfaces is inclined toward the side of the imaging regions with increasing distance from the light-shielding wall,
wherein, when an inclination angle is an angle that a plane parallel with the imaging plane forms with the inclined surface, the plurality of inclined surfaces comprise inclined surfaces having different inclination angles, and the inclined surfaces having different inclination angles have a smaller inclination angle on the side of the imaging regions than the side of the lens module, and
wherein the inclination angle of each of the inclined surfaces is set to an angle at which reflected light of light impinging on the inclined surface among incident light that has passed through the lens module and the optical filter forms an image outside the imaging region.

2. The compound-eye camera module according to claim 1, wherein each of the inclined surfaces is a continuous surface that extends in a direction parallel with the imaging plane.

3. The compound-eye camera module according to claim 1, wherein each of the inclined surfaces is separated into a plurality of blocks in a direction parallel with the imaging plane.

4. A compound-eye camera module comprising:
a lens module that comprises a plurality of lenses;
a plurality of optical filters corresponding to the individual lenses;
an imaging device that comprises a plurality of imaging regions corresponding to the individual optical filters; and
a light-shielding wall that is provided perpendicularly to the imaging device;
wherein the adjacent imaging regions are partitioned by the light-shielding wall,
the light-shielding wall comprises a plurality of inclined surfaces that are inclined with respect to an imaging plane of the imaging regions, the plurality of inclined surfaces being disposed sequentially from a side of the lens module to a side of the imaging regions, and
each of the inclined surfaces is inclined toward the side of the imaging regions with increasing distance from the light-shielding wall,
wherein, when an inclination angle is an angle that a plane parallel with the imaging plane forms with the inclined surface, the plurality of inclined surfaces have the inclination angles that decrease from the side of the lens module to the side of the imaging regions, and
wherein an inclination angle of each of the inclined surfaces is set to an angle at which reflected light of light impinging on the inclined surface among incident light that has passed through the lens module and the optical filter forms an image outside the imaging region.

5. The compound-eye camera module according to claim 4, wherein each of the inclined surfaces is a continuous surface that extends in a direction parallel with the imaging plane.

6. The compound-eye camera module according to claim 4, wherein each of the inclined surfaces is separated into a plurality of blocks in a direction parallel with the imaging plane.

7. A compound-eye camera module comprising:
a lens module that comprises a plurality of lenses;
a plurality of optical filters corresponding to the individual lenses;
an imaging device that comprises a plurality of imaging regions corresponding to the individual optical filters; and
a light-shielding wall that is provided perpendicularly to the imaging device;
wherein the adjacent imaging regions are partitioned by the light-shielding wall,
the light-shielding wall comprises a plurality of inclined surfaces that are inclined with respect to an imaging plane of the imaging regions, the plurality of inclined surfaces being disposed sequentially from a side of the lens module to a side of the imaging regions, and
each of the inclined surfaces is inclined toward the side of the imaging regions with increasing distance from the light-shielding wall,
wherein, when an inclination angle is an angle that a plane parallel with the imaging plane forms with the inclined surface, the light-shielding wall is divided into a plurality of regions in an optical axis direction of the plurality of lenses according to the inclination angles of the inclined surfaces, and while the inclination angles of the inclined surfaces in each of the regions are set to the same, the inclination angles in the individual regions decrease from the side of the lens module to the side of the imaging regions, and
wherein an inclination angle of each of the inclined surfaces is set to an angle at which reflected light of light impinging on the inclined surface among incident light that has passed through the lens module and the optical filter forms an image outside the imaging region.

8. The compound-eye camera module according to claim 7, wherein each of the inclined surfaces is a continuous surface that extends in a direction parallel with the imaging plane.

9. The compound-eye camera module according to claim 7, wherein each of the inclined surfaces is separated into a plurality of blocks in a direction parallel with the imaging plane.

10. A compound-eye camera module comprising:
a lens module that comprises a plurality of lenses;
a plurality of optical filters corresponding to the individual lenses;
an imaging device that comprises a plurality of imaging regions corresponding to the individual optical filters; and
a light-shielding wall that is provided perpendicularly to the imaging device;
wherein the adjacent imaging regions are partitioned by the light-shielding wall, and
the light-shielding wall comprises a plurality of inclined surfaces that are inclined with respect to an imaging plane of the imaging regions, the plurality of inclined surfaces being disposed sequentially from a side of the lens module to a side of the imaging regions and each of the inclined surfaces is inclined toward the side of the imaging regions with increasing distance from the light-shielding wall;
an outer tube part provided with a hollow part,
wherein the light-shielding wall and the imaging device are disposed in the hollow part, and the hollow part is inclined so as to expand outward from the side of the lens module to a side of the imaging device and is larger than an outer shape of the imaging device at least in a portion surrounding the imaging device,
wherein an inclination angle of each of the inclined surfaces, an inclination angle of a portion of the hollow part inclined so as to expand outward and a size of the portion of the hollow part surrounding the imaging device are set so that reflected light of light impinging on the inclined surface among incident light that has passed through the lens module and the optical filter forms an image outside the imaging region.

* * * * *